(12) United States Patent
Copeland et al.

(10) Patent No.: US 6,752,836 B1
(45) Date of Patent: Jun. 22, 2004

(54) METHOD AND APPARATUS FOR HIGH-CONCURRENCY CLIENT LOCKING WITH JAVA IN A DATA PROCESSING SYSTEM

(75) Inventors: George Prentice Copeland, Austin, TX (US); Matthew D. McClain, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/359,274

(22) Filed: Jul. 22, 1999

(51) Int. Cl.[7] .................................................. G06F 9/46
(52) U.S. Cl. ...................................... 709/102; 709/248
(58) Field of Search ............................. 707/8; 709/102, 709/106, 107; 717/141, 118; 711/118

(56) References Cited

U.S. PATENT DOCUMENTS

| | | | | | |
|---|---|---|---|---|---|
| 5,057,996 A | * | 10/1991 | Cutler et al. | ................. | 709/106 |
| 5,875,461 A | * | 2/1999 | Lindholm | ................... | 711/118 |
| 6,029,190 A | * | 2/2000 | Oliver | ......................... | 709/107 |
| 6,141,794 A | * | 10/2000 | Dice et al. | ................... | 717/118 |
| 6,173,442 B1 | * | 1/2001 | Agesen et al. | ............... | 717/141 |
| 6,510,437 B1 | * | 1/2003 | Bak et al. | ................ | 707/103 X |

OTHER PUBLICATIONS

Iyengar et al.; Improving Web Server Performance by Caching Dynamic Data; Proceedings on the USENIX Symposium on Internet Technologies and Systems; 1998.

Challenger et al.; A Scalable and Highly Available System for Serving Dynamic Data At Frequently Accessed Web Sites; 1998 High Performance Networking and Computing Conference; pp. 1–23.

Challenger et al.; A Scalable System For Consistently Catching Dynamic Web Data; Infocom 1999 pp 1–22.

* cited by examiner

*Primary Examiner*—John Follansbee
*Assistant Examiner*—Dustin Nguyen
(74) *Attorney, Agent, or Firm*—Duke W. Yee; David A. Mims, Jr.

(57) ABSTRACT

The present invention provides a method and apparatus in a data processing system for managing access to objects (called an element) in a collection of objects (called a container) in a high-concurrency environment. A request is received from a requester for an element's mutex given an identifier for the element. This mutex can be used as a mutex in a synchronized block to lock the object during that synchronized block. To compute the mutex for an element, the first instance seen by the container of the element's identifier is used. To do this, a determination is made as to whether there is already an instance of the identifier with the same value in a value set. If so, that value is returned to the requester for use as a mutex. If not, the current identifier instance is saved in the value set and returned. This allows the object to be locked prior to the existence of the object.

18 Claims, 4 Drawing Sheets

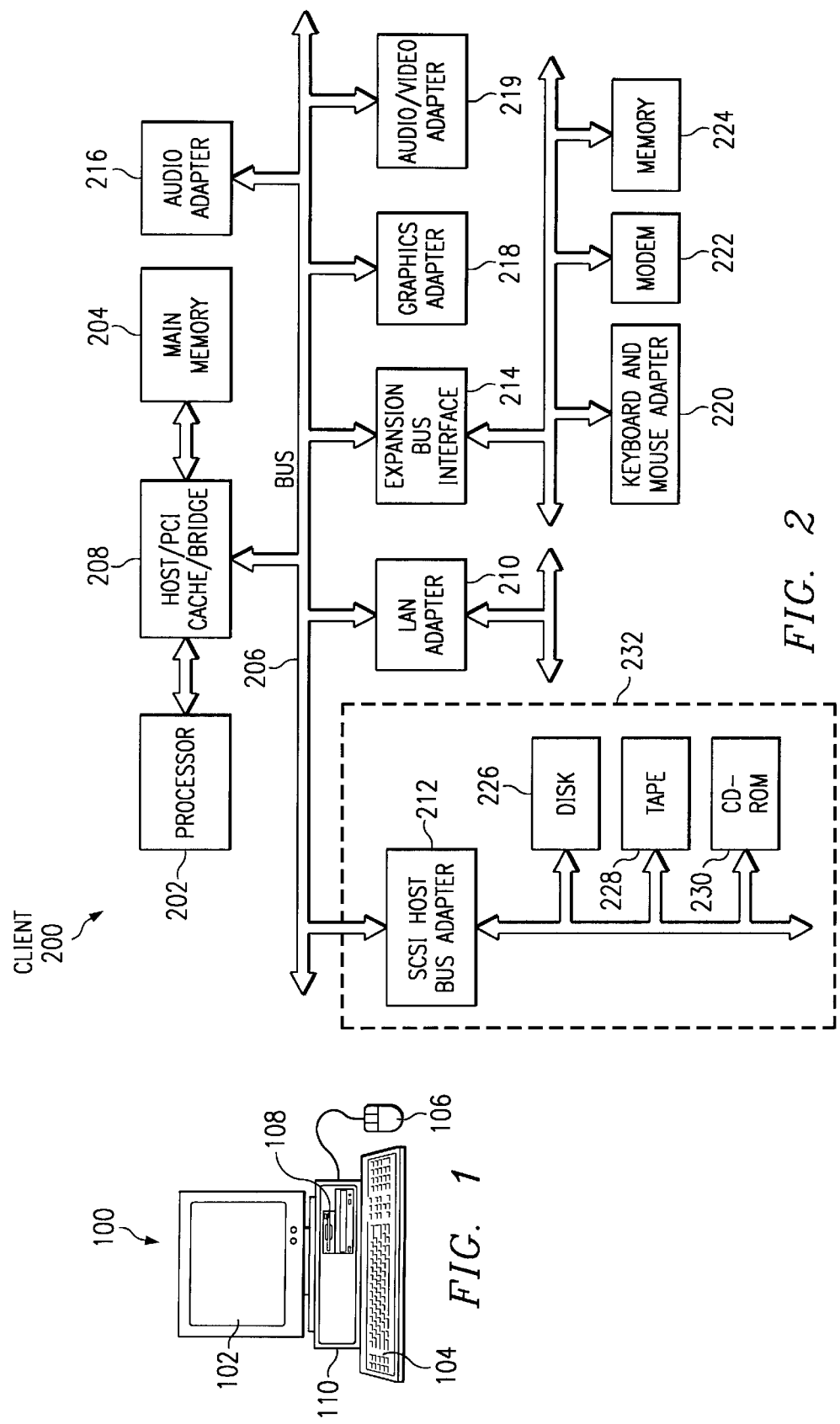

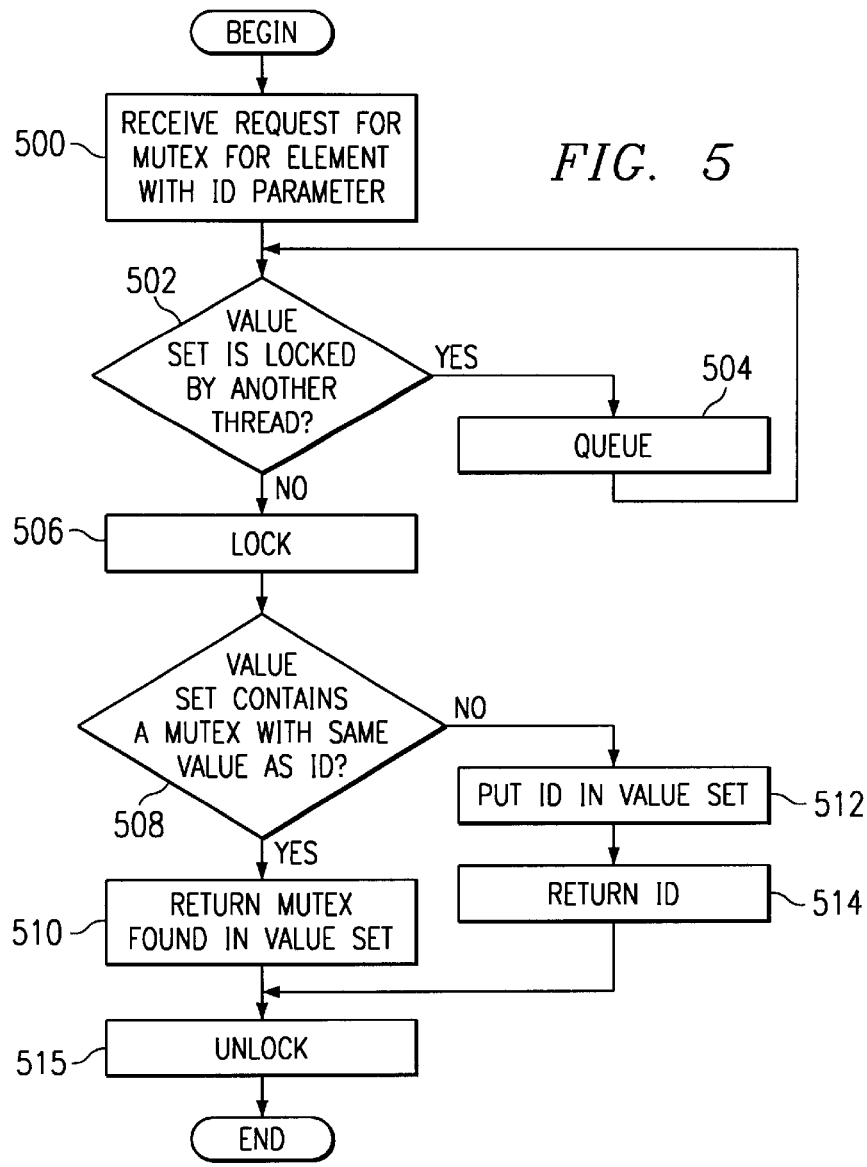

```
class Container                                          700
{
      protected ValueSet mutexValueSet = new ValueSet();
      . . .
      public Object getMutex(String id)
      {
 702 ⎯ synchronized(mutexValueSet) {
  704 ⎯⎯ Object mutex = mutexValueSet.getEntryWithSameValue(id);
   706 ⎯⎯ if (mutex == null) {
              mutexValueSet.addEntryWithThisValue(id);
   710 ⎯ return id;
          }        708
          return mutex; ⎯ 712       FIG. 7
      }
}
```

```
                                                        800
        802
synchronized(container.getMutex(id)) {
    element = (String) container.get(id);
    if (element == null) {
        element = produceElement(id);  // may take a long time
        container.put(id, element);
    }
    useElement(element);
}                                         FIG. 8
```

```
class Container                                          900
{
      . . .
      public Object get(String id)
      {
          synchronized(getMutex(id)) {
              synchronized(this) {
                  // Use global state to get value
                  return value;
              }
          }                               FIG. 9
      }
}
```

METHOD AND APPARATUS FOR HIGH-CONCURRENCY CLIENT LOCKING WITH JAVA IN A DATA PROCESSING SYSTEM

CROSS REFERENCE TO RELATED APPLICATIONS

The present invention is related to applications entitled METHOD AND APPARATUS FOR MANAGING INTERNAL CACHES AND EXTERNAL CACHES IN A DATA PROCESSING SYSTEM, Ser. No. 09/359,275 now U.S. Pat. No. 6,507,891; METHOD AND APPARATUS FOR CACHE COORDINATION FOR MULTIPLE ADDRESS SPACES, Ser. No. 09/359,270 now U.S. Pat. No. 6,615,235; METHOD AND APPARATUS FOR INVALIDATING DATA IN A CACHE, Ser. No. 09/359,277 now U.S. Pat. No. 6,584,598; METHOD AND APPARATUS FOR AGGRESSIVELY RENDERING DATA IN A DATA PROCESSING SYSTEM, Ser. No. 09/359,279 now U.S. Pat. No. 6,557,076; and A METHOD AND APPARATUS FOR CACHING CONTENT IN A DATA PROCESSING SYSTEM WITH FRAGMENT GRANULARITY, Ser. No. 09/359,279 now U.S. Pat. No. 6,457,103; all of which are filed even date hereof, assigned to the same assignee, and incorporated herein by reference.

BACKGROUND OF THE INVENTION

1. Technical Field

The present invention relates generally to an improved data processing system and in particular to a method and apparatus for locking objects with high concurrency. Still more particularly, the present invention provides a method and apparatus for locking objects in a Java virtual machine with high concurrency.

2. Description of Related Art

Java™ is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods. Java provides a mechanism to distribute software and extends the capabilities of a Web browser because programmers can write an applet once and the applet can be run on any Java enabled machine on the Web.

The Java virtual machine (JVM) is a virtual computer component that resides only in memory. The JVM allows Java programs to be executed on different platforms as opposed to only the one platform for which the code was compiled. Java programs are compiled for the JVM. In this manner Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run time system. The Java compiler generates bytecode instructions that are non-specific to particular computer architectures. A bytecode is a machine independent code generated by the Java compiler and executed by a Java interpreter. A Java interpreter is a module in the JVM that alternatively decodes and executes a bytecode or bytecodes. These bytecode instructions are designed to be easy to interpret on any machine and easily translated on the fly into native machine code.

A development environment, such as the Java Development Kit (JDK) available from Sun Microsystems, Inc., may be used to build Java bytecode from Java language source code and libraries. This Java bytecode may be stored as a Java application or applet on a Web Server, where it can be downloaded over a network to a user's machine and executed on a local JVM.

A mutex is the thing that is locked. A lock is the state of holding the mutex. Locking is the act of getting a lock on the mutex.

Each object in a JVM is associated with a "mutex" for locking. This locking is used to coordinate multi-threaded access to an object. With respect to accessing objects in a JVM, Java has limitations on how objects are locked. In particular, synchronization blocks are employed to lock objects instead of explicit locking and unlocking of objects. This implies that a lock must be obtained and released in a contiguous block of code. Also, within Java a mechanism is absent to see if an object is locked. This implies that the only way to see if an object is locked it to lock it. Existing high concurrency mechanisms (e.g. cache managers) are implemented without these restrictions. Therefore, it would be advantageous to have a method and apparatus for providing high-concurrency locking mechanism for objects in a Java environment.

SUMMARY OF THE INVENTION

The present invention provides a method and apparatus in a data processing system for managing access to objects (called an element) in a collection of objects (called a container) in a high-concurrency environment. A request is received from a requester for an element's mutex given an identifier for the element. This mutex can be used as a mutex in a synchronized block to lock the object during that synchronized block.

To compute the mutex for an element, the first instance seen by the container of the element's identifier is used. To do this, a determination is made as to whether there is already an instance of the identifier with the same value in a value set. If so, that value is returned to the requester for use as a mutex. If not, the current identifier instance is saved in the value set and returned. This allows the object to be locked prior to the existence of the object.

BRIEF DESCRIPTION OF THE DRAWINGS

The novel features characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a data processing system in which the present invention may be implemented depicted in accordance with a preferred embodiment of the present invention;

FIG. 2 is a block diagram illustrating a data processing system in which the present invention may be implemented;

FIG. 5 is a flowchart of a process for locking and providing access to an element depicted in accordance with a preferred embodiment of the present invention;

FIG. 6 is a diagram of pseudo code for obtaining an element from a container depicted in accordance with a preferred embodiment of the present invention;

FIG. 7 is a diagram illustrating pseudo code for obtaining a mutex for an element depicted in accordance with a preferred embodiment of the present invention;

FIG. 8 is pseudo code for locking an element across container calls depicted in accordance with a preferred embodiment of the present invention; and FIG. 9 is pseudo code for handling a client call without a synchronized block depicted in accordance with a preferred embodiment of the present invention.

DETAILED DESCRIPTION OF THE PREFERRED EMBODIMENT

Figure 3:
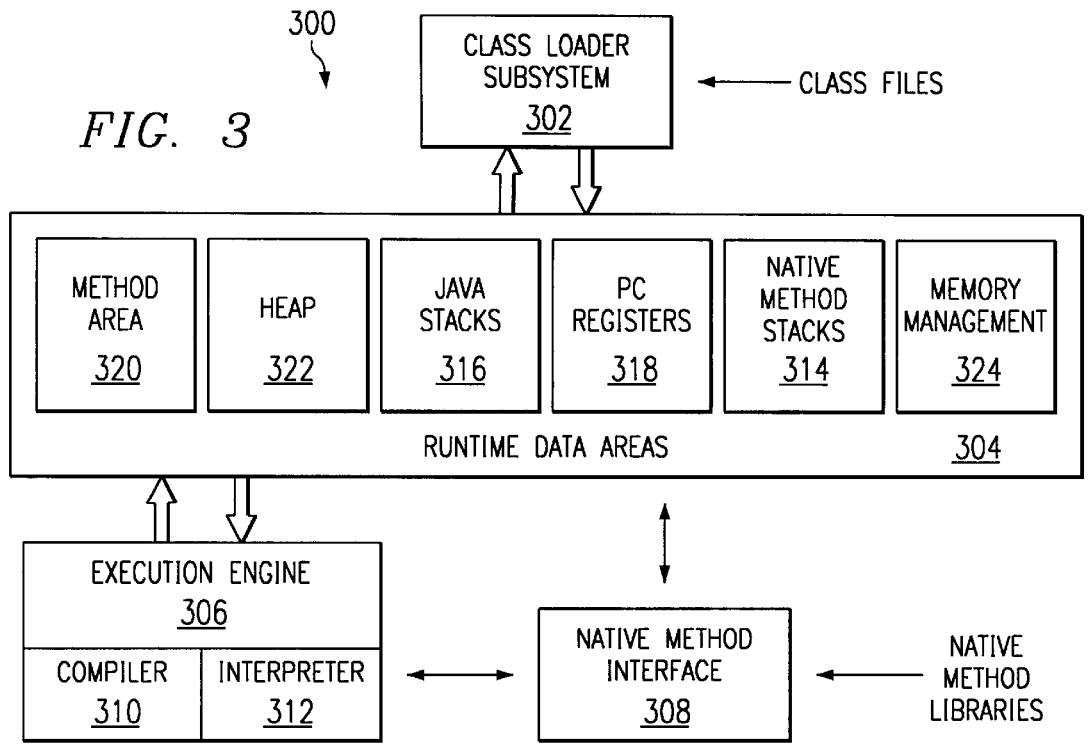
FIG. 3 is a block diagram of a Java virtual machine depicted in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A personal computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Personal computer 100 can be implemented using any suitable computer, such as an IBM Aptiva™ computer, a product of International Business Machines Corporation, located in Armonk, N.Y. Although the depicted representation shows a personal computer, other embodiments of the present invention may be implemented in other types of data processing systems, such as network computers, Web based television set top boxes, Internet appliances, etc. Computer 100 also preferably includes a graphical user interface that may be implemented by means of systems software residing in computer readable media in operation within computer 100. With reference now to FIG. 2, a block diagram illustrates a data processing system in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Micro Channel and ISA may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

With reference now to FIG. 3, a block diagram of a Java virtual machine is depicted in accordance with a preferred embodiment of the present invention. JVM 300 includes a class loader subsystem 302, which is a mechanism for loading types, such as classes and interfaces, given fully qualified names. JVM 300 also contains runtime data areas 304, execution engine 306, native method interface 308, and memory management 324. Execution engine 306 is a mechanism for executing instructions contained in the methods of classes loaded by class loader subsystem 302. Execution engine 306 may be, for example, Java interpreter 312 or just-in-time compiler 310. Native method interface 308 allows access to resources in the underlying operating system. Native method interface 308 may be, for example, a Java native interface.

Runtime data areas 304 contain native method stacks 314, Java stacks 316, PC registers 318, method area 320, and heap 322. These different data areas represent the organization of memory needed by JVM 300 to execute a program.

Java stacks 316 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it. A JVM does not have any registers for holding intermediate values; any Java instruction that requires or produces an intermediate value uses the stack for holding the intermediate values. In this manner, the Java instruction set is well-defined for a variety of platform architectures.

PC registers 318 are used to indicate the next instruction to be executed. Each instantiated thread gets its own pc register (program counter) and Java stack. If the thread is executing a JVM method, the value of the pc register indicates the next instruction to execute. If the thread is executing a native method, then the contents of the pc register are undefined.

Native method stacks 314 store the state of invocations of native methods. The state of native method invocations is stored in an implementation-dependent way in native method stacks, registers, or other implementation-dependent memory areas. In some JVM implementations, native method stacks 314 and Java stacks 316 are combined.

Method area 320 contains class data while heap 322 contains all instantiated objects. The JVM specification strictly defines data types and operations. Most JVM implementations choose to have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 322. JVM 300 includes an instruction that allocates memory space within the memory for heap 322 but includes no instruction for freeing that space within the memory. Memory management 324 in the depicted example manages memory space within the memory allocated to heap 322. Memory management 324 may include a garbage collector which automatically reclaims memory used by objects that are no longer referenced by an application. Additionally, a garbage collector also may move objects to reduce heap fragmentation.

The present invention provides a method, apparatus, and instructions for providing high concurrency client-locking in Java. The mechanism of the present invention supports a collection of objects, called elements, in a container object in which a client or requester may use a Java synchronization block to lock a specific element. This synchronization block can spans multiple methods on the container.

The client asks the container for a mutex using the getMutex method to be used in this synchronization block. The mechanism of the present invention for computing a mutex exploits the fact that the String.hashCode and String.equals methods in Java are based on a string's value instead of its identity. This fact allows a value set to be used where membership is based on value instead of identity by calling the instance's hashcode and equals methods. The value set contains a plurality of mutexes for elements. An element's mutex is the first instance of the element's identifier seen by the container. During a getMutex method, if an instance of an element's identifier is not found in the value set, the instance of the element's identifier provided as a getMutex method parameter becomes the mutex for the element and is put in the value set. This mutex may be used to lock elements and allows an element to be locked prior to the existence of the element in the collection.

The locking mechanism for the present invention may be applied to various containers in a JVM. The multithread concurrency design principles for a container are:

(1) It is OK for a thread holding an element lock to wait on the container lock.

(2) It is not OK for a thread holding the container lock to wait on any lock other than the container lock.

(3) In some cases, the client needs to hold an element lock across container method calls (e.g. while producing an element). This should block other clients wanting to use the element, but should not block any other clients. A client cannot hold a lock on the entire container.

(4) In other cases, the client only needs to hold a lock during the execution of an individual method on the container.

The following multithread concurrency design supports the above principles efficiently:

(1) The getMutex method is used to get a mutex for locking elements. This method allows an element to be locked prior to the existence of an element.

(2) When the client wants to hold a lock on an element across multiple methods, it gets a lock on the element's ID mutex which is obtained via the getMutex method, which is described in more detail below.

(3) When the client wants to hold a lock only during a single method, the method is simply called.

(4) For implementation of methods that operate on the container's global state, synchronizion uses the container as a mutex because these take very short time intervals.

Figure 4:
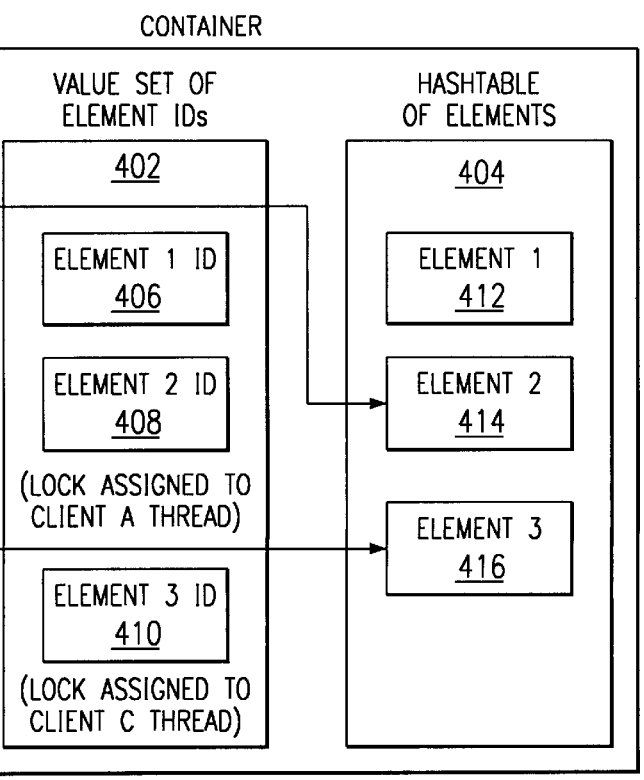
FIG. 4 is a block diagram of a lock mechanism for a container depicted in accordance with a preferred embodiment of the present invention.

With reference now to FIG. 4, a block diagram of a lock mechanism for a container is depicted in accordance with a preferred embodiment of the present invention. Container 400 may take various forms. For example, container 400 may be a cache containing elements in the form of parts of a web page. In Java, a "mutex" is associated with each object and class. A lock is a privilege that only one thread can "own" at any one time. When the lock on the mutex is acquired, no other thread or client can get a lock on the mutex until the thread or client owning the lock releases it. The example is described with respect to an element, which uses a separate object for its mutex.

In FIG. 4, container 400 includes a value set 402 which contains the mutexes for the elements. Each mutex is the first element ID instance seen by the container, so that the same mutex for a given element. These element IDs are returned by the getMutex method. In this example, value set 402 contains element 1 ID 406, element 2 ID 408, and element 3 ID 410. Container 400 also includes a hash table 404. Hash table 404 includes, element 1 412, element 2 414, and element 3 416. Hash table 404 contains all elements that have already been added to the container indexed by element ID.

In the depicted example, client A thread 418, client B thread 420, and client C thread 422 concurrently request access to elements within container 400. These client threads send a request in the form of a string in which the string contains the identifier for the element. Each thread using its own element ID as a mutex is not possible because the ID is a string and each client may create a new instance each time. For correct synchronization, the same instance must be used for a mutex by all clients, so the first ID seen by the container for an element is saved in the value set and returned to all client threads as a mutex for the element.

Client A thread 418 request element 2. The element may or may not be located in the container. An element is in the container only if a client has previously added it to the container. The method described here allows the element to be locked even if it does not yet exist—as long as an identifier value has been determined for it. For example, an element may have an ID value in value set 402 but is absent from hashtable 404 because the element has been locked by a thread but not yet added by that thread.

In the example of FIG. 4, element 2 is not initially in the container. Client A thread gets a mutex on element 2. Since client A thread is the first client to deal with element 2, the container saves the element ID instance that client A thread supplied in the value set and returns it to client A thread. Using this mutex, client A thread begins a synchronization block that determines that element 2 is not in the container, produces element 2 and puts in the container. While this synchronization block is being processed, client B thread asks for a mutex for element 2. Since there is one in the value set (the one from client A thread), client B thread gets the same mutex that client A thread got. Client B thread tries to begin its own synchronization block to do something with element 2, but this is queued by the Java Virtual Machine until client A thread's synchronization block has completed.

Concurrently with the other two threads, client C thread 422 in this example sends a request including an element identifier for element 3. Client C thread is not queued waiting on either client A or B, because a different mutex is used. Instead, client C thread can access element 3 concurrently with clients A and B access element 2.

With reference now to FIG. 5, a flowchart of a process for locking and providing access to an element is depicted in accordance with a preferred embodiment of the present invention. The process begins by receiving a request for an element (step 500). This request is received from a client with an element ID input parameter. A test if made by the Java virtual machine to see if the value set is already locked by another thread (step 502). If it is already locked, then it is queued until the lock becomes available (step 504), and this test is repeated until it is no longer locked by another thread. The lock is then granted for this thread (step 506). A test is made to see if the element ID is present in the value set (step 508). If it is present, it is returned as the mutex for the element (step 510). If it is not present, the element ID is put in the value set (step 512) and returned as the mutex for the element (step 514). In either case, the value set is unlocked (step 510) with the process terminating thereafter.

FIGS. 6–9 illustrate pseudo code for using and implementing the processes of the present invention. This pseudo code is in Java. Turning next to FIG. 6, a diagram of pseudo code for obtaining an element from a container is depicted in accordance with a preferred embodiment of the present invention. The code 600 in FIG. 6 provides for returning elements in response to a request. In addition, this code includes a synchronized statement in line 602 which allows locking through synchronization blocks. For high concurrency, the mutex in line 602 represents the element instead of the container. In line 604, the element is requested. A determination is made as to whether the element is present in line 606. In line 608, if the element is not present, the client requesting the element will produce the requested element. The requested element is placed into the container after it is produced in line 610. In line 612, the element is returned to the requester. With the synchronization block in code 600, the Java virtual machine causes additional clients requesting the same element to wait for the first client to produce the element, rather than each of the clients redundantly producing the same element.

Using the element itself is not possible, because the get method would have to be done prior to the synchronize block, and the element could be removed from the container during the window between the get method and the synchronize block. A client using its own ID is not possible, because the ID is a string and a new instance of it may be created every time.

With reference now to FIG. 7, a diagram illustrating pseudo code for obtaining a for an element mutex is depicted in accordance with a preferred embodiment of the present invention. Code 700 illustrates a field and method used in the container to obtain a mutex for the element. In this example, the method in code 700 is called a getMutex method. The getMutex method implementation exploits the fact that the String.hasCode and String.equals methods are based on the string's value instead of its identity. This allows a ValueSet to be used, where set membership is based on equal value, so it calls the value's hashCode and equals method. In the getMutex method, the first ID object with a given value becomes the mutex for that ID value.

Line 702 in code 700 will lock the entire value set while the mutex is being identified or retrieved. This does not limit concurrency because it happens is a very short period of time. Line 704 sets the mutex equal to the identifier that was in the ValueSet having an equal value to the identifier that was supplied by the requesting client as an input parameter to the getMutex method. In line 706, a determination is made as to whether there was an entry present for the value in the value set. If an entry was not present, then in line 708 an entry is added to the value set with the element identifier, which is then returned in line 710 to be used as the mutex for the element. If an entry was present, then in line 712 the mutex found in the value set is returned to be used as the mutex for the element.

With reference now to FIG. 8, pseudo code for locking an element across container calls is depicted in accordance with a preferred embodiment of the present invention. Code 800 includes instructions that attempt to find an element in a container. If the element is not present, code 800 produces the element and places it in the container. The synchronized statement in line 802 prevents the performance overhead of multiple calls being generated to a backend server when multiple nearly concurrent request occur for the same element. Instead, the first request would cause a backend server call to be executed, and all other requests would wait on that one to finish. When this first request is finished, all other requests would find the element in the container.

Turning next to FIG. 9, pseudo code for handling a client call without a synchronized block is depicted in accordance with a preferred embodiment of the present invention. Code 900 ensures that the fine granularity lock (i.e., on the element) is obtained prior to holding the coarse granularity lock (i.e., on the container). Otherwise, another client holding a lock on the same element for an indefinitely long period of time could cause the entire container to be locked during that period of time. High concurrency can be obtained only if the coarse granularity is held for a very short period of time.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the a distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted examples are implemented in Java, the processes of the present invention may be applied to other types of interpretive languages and even to non-interpretive languages using object oriented paradigms. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for multithreaded execution in a data processing system for managing access to objects in a container by way of synchronized blocks, the method comprising:

using an identifier object to retrieve a mutex object from a value set, wherein the identifier object has a value that distinguishes the mutex object from other objects in the value set and that also distinguishes a desired object from other objects in the container;

in response to retrieving the mutex object from the value set, entering a synchronized block that locks the mutex object;

while in the synchronized block that locks the mutex object, accessing the container to determine whether the desired object is present within the container;

while in the synchronized block that locks the mutex object, in response to a determination that the desired object is not within the container, producing the desired object from an alternative source for insertion into the container;

while in the synchronized block that locks the mutex object, accessing the desired object from the container; and exiting the synchronized block that locks the mutex object, whereby mutual exclusion with respect to accessing the desired object is maintained regardless or whether the desired object is present with the container.

2. The method of claim 1, wherein retrieving the mutex object from the value set includes:

determining whether any mutex object that is associated with the value of the identifier object exists within the value set; and in response to a determination that no mutex object that is associated with the value of the identifier object exists within the value set, creating the mutex object for insertion into the value set.

3. The method of claim 1, wherein the synchronized block that locks the mutex object is a first synchronized block and accessing the desired object from the container includes:

while in the first synchronized block, entering a second synchronized block that locks the container;

while in the second synchronized block, retrieving the desired object from the container; and exiting the second synchronized block.

4. The method of claim 1, wherein the identifier object is a string.

5. The method of claim 1, wherein the container is a cache.

6. The method of claim 1, wherein the method is executed in a Java virtual machine.

7. A multithreaded computer program product for managing access to objects in a container by way of synchronized blocks, the computer program product being in a computer-readable medium and comprising instructions that, when executed by a computer, cause the computer to perform actions that include:

using an identifier object to retrieve a mutex object from a value set, wherein the identifier object has a value that distinguishes the mutex object from other objects in the value set and that also distinguishes a desired object from other objects in the container;

in response to retrieving the mutex object from the value set, entering a synchronized block that locks the mutex object;

while in the synchronized block that locks the mutex object, accessing the container to determine whether the desired object is present within the container;

while in the synchronized block that locks the mutex object, in response to a determination that the desired object is not within the container, producing the desired object from an alternative source for insertion into the container;

while in the synchronized block that locks the mutex object, accessing the desired object from the container; and exiting the synchronized block that locks the mutex object, whereby mutual exclusion with respect to accessing the desired object is maintained regardless of whether the desired object is present within the container.

8. The computer program product of claim 7, wherein retrieving the mutex object from the value set includes:

determining whether any mutex object that is associated with the value of the identifier object exists within the value set; and in response to a determination that no mutex object that is associated with the value of the identifier object exists within the value set, creating the mutex object for insertion into the container.

9. The computer program product of claim 7, wherein the synchronized block that locks the mutex object is a first synchronized block and accessing the desired object from the container includes:

while in the first synchronized block, entering a second synchronized block that locks the container;

while in the second synchronized block, retrieving the desired object from the container; and exiting the second synchronized block.

10. The computer program product of claim 7, wherein the identifier object is a string.

11. The computer program product of claim 7, wherein the container is a cache.

12. The computer program product of claim 7, wherein the instructions are executed in a Java virtual machine.

13. A data processing system for managing access to objects in a container by way of synchronized blocks comprising:

means for using an identifier object to retrieve a mutex object from a value set, wherein the identifier object has a value that distinguishes the mutex object from other objects in the value set and that also distinguishes a desired object from other objects in the container;

means, responsive to retrieving the mutex object from the value set, for entering a synchronized block that locks the mutex object;

means, operative while in the synchronized block that locks the mutex object, for accessing the containew to determine whether the desired object is present within the container;

means, operative while in the synchronized block that locks the mutex object and responsive to a determination that the desired object is not within the container, for producing the desired object from an alternative source for insertion into the container;

means, operative while in the synchronized block that locks the mutex object, for accessing the desired object form the container; and means for exiting the synchronized block that locks the mutex object, whereby mutual exclusion with respect to accessing the desired object is maintained regardless of whether the desired object is present with the container.

14. The data processing system of claim 13, wherein the means for retrieving the mutex object from the value set includes:

means for determining whether any mutex object that is associated with the value of the identifier object exists within the value set; and means, responsive to a determination that no mutex object that is associated with the value of the identifier object exists within the value set, for creating the mutex object for insertion into the value set.

15. The data processing system of claim 13, wherein the synchronized block that locks the mutex object is a first synchronized block and the means for accessing the desired object from the container includes:

means, operative while in the first synchronized block, for entering a second synchronized block that locks the container;

means, operative while in the second synchronized block, for retrieving the desired object from the container; and means for exiting the second synchronized block.

16. The data processing system of claim 13, wherein the identifier object is a string.

17. The data processing system of claim 13, wherein the container is a cache.

18. The data processing system of claim 13, wherein the data processing system is executed in a Java virtual machine.

* * * * *

UNITED STATES PATENT AND TRADEMARK OFFICE
CERTIFICATE OF CORRECTION

PATENT NO. : 6,752,836 B1  
APPLICATION NO. : 09/359274  
DATED : June 22, 2004  
INVENTOR(S) : Copeland et al.

Page 1 of 1

It is certified that error appears in the above-identified patent and that said Letters Patent is hereby corrected as shown below:

Col. 1, line 14: after "Ser. No." delete "09/359,270" and insert --09/359,276--.

Col. 1, line 19: after "Ser. No." delete "09/359,279" and insert --09/359,278--.

Col. 9, line 51: after "regardless" delete "or" and insert --of-- .

Col. 10, line 48: after "into the" delete "container" and insert --value set--.

Col. 11, line 10: after "accessing the" delete "containew" and insert --container--.

Col. 11, line 20: before "the" delete "form" and insert --from--.

Signed and Sealed this

Twenty-first Day of August, 2007

JON W. DUDAS  
*Director of the United States Patent and Trademark Office*